Patented Dec. 29, 1942

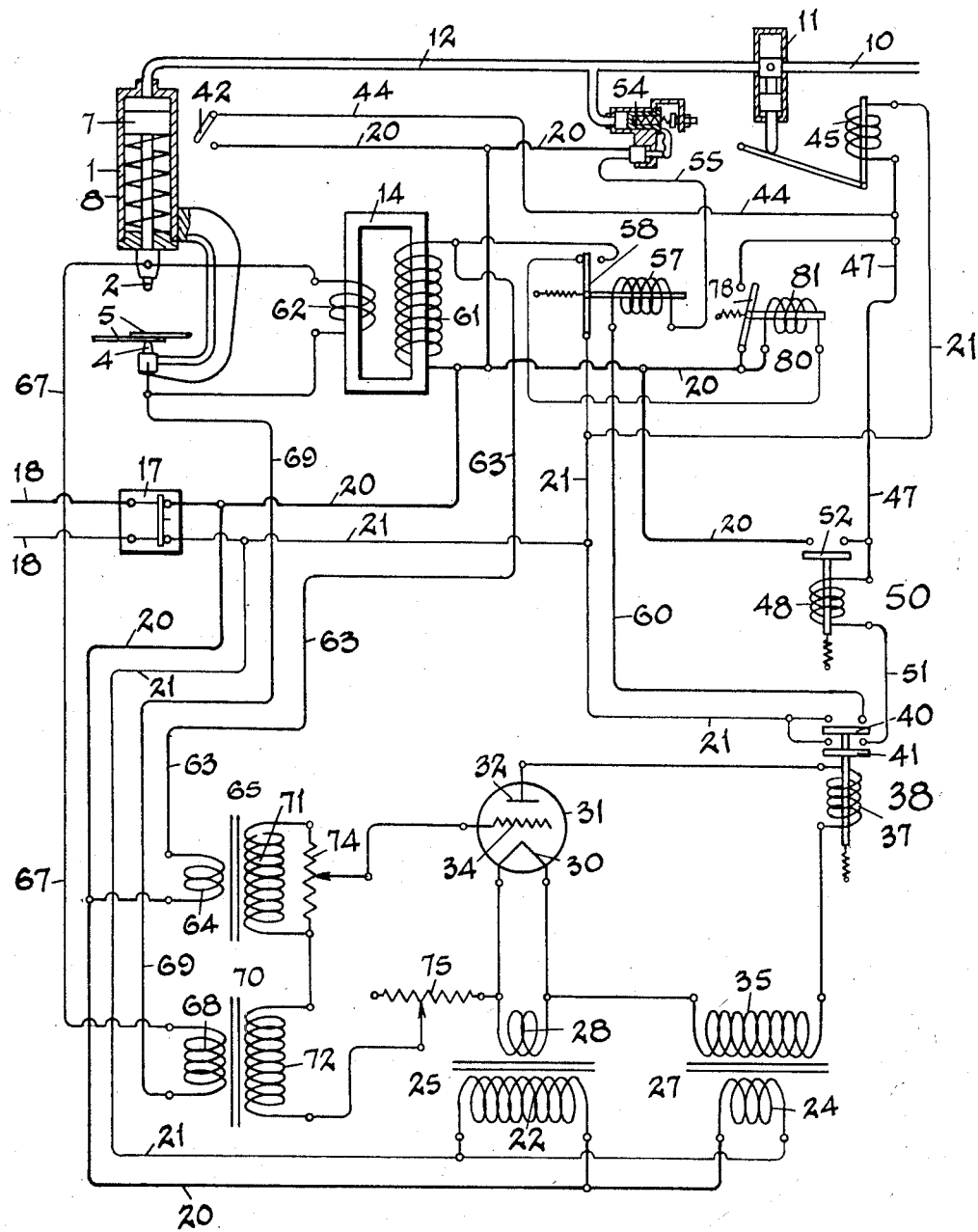

2,306,593

UNITED STATES PATENT OFFICE 2,306,593

WELDING APPARATUS

Cletus J. Collom, Detroit, Mich., assignor to Weltronic Corporation, Detroit, Mich., a corporation of Michigan Application August 2, 1939, Serial No. 287,973

5 Claims. (Cl. 219—4)

My invention has for its object to produce an efficient means for terminating the flow of the welding current immediately upon the production of a welding integration of the parts of the work such that, when cooled, an efficient weld will be produced. The invention, particularly, provides means that is sufficiently sensitive to the changing resistance to the flow of the welding current, through the parts of the work, to cause termination of the flow of the welding current when a proper welding integration of the metal of the parts of the work is produced to prevent excess fusion or melting of the metal and to prevent burning of the metal.

Systems containing the invention may partake of different forms and may be varied in their details and still embody the invention. To illustrate a practical application of the invention, I have selected a spot welding apparatus as an example of the various structures containing the invention and shall describe the selected structure hereinafter, it being understood that certain features of my invention may be used to advantage without a corresponding use of other features of the invention and without departing from the spirit of the invention, as presented in the claims. The particular structure selected is shown in the accompanying drawing.

The figure of the drawing illustrates a welding apparatus having an electrical control system for controlling the flow of the welding current through the work.

In the form of apparatus shown in the drawing, 1 is a welder having the electrodes 2 and 4 that are caused to engage the parts of the work 5, when the electrode 2 is operated by a piston 7 and a cylinder 8. A pipe 10 is connected to a source of supply of fluid pressure and a valve 11 is operable to connect the pipe 10 with the cylinder 8, through a pipe 12. When the pressure, transmitted to the electrodes 2 and 4, reaches a predetermined point, a welding current, produced by a transformer 14, is caused to flow to the electrodes and through the work.

In order to operate the welder, the main-line switch 17 is closed to connect the electric circuit of the welding apparatus with the source of supply of electric current through the main lines 18. The main-line switch 17 connects the lines 18 with the lines 20 and 21 of the electric system of the apparatus. The lines 20 and 21 and their branches constitute the feed lines to parts of the apparatus.

When the switch 17 is closed, the primaries 22 and 24 of the transformers 25 and 27 are energized by the flow of the current through the lines 20 and 21. The secondary 28 of the transformer 25 is connected to a filament 30 of an electronic tube 31. The tube has a plate electrode 32 and a grid 34 and, except when the grid 34 is charged, a one-way emission of the electric current is produced from the filament 30 to the plate electrode 32 which conducts or permits the flow of the current, produced by the secondary 35 of the transformer 27, through the tube 31 and the solenoid 37 of the relay 38, to the secondary 35. Thus, upon the closure of the switch 17, the relay 38 closes the circuits through its movable contacts 40 and 41.

When it is desired to produce a weld, a switch 42, which is, preferably, located on the welder for convenience of manual operation, is closed. The switch 42 connects the line 20 with the line 44 and completes a circuit through the solenoid 45 to the line 21 for the purpose of electromagnetically operating the valve 11 to cause transmission of the pressure of the source of supply of fluid pressure through the pipes 10 and 12 to the welder and produce the required welding pressure of the electrodes 2 and 4 on the work 5. The switch 42, also, completes a circuit from the line 20 through the line 44, the line 47, the solenoid 48 of the delay 50, the line 51, the movable contact 41 of the relay 38, to the line 21. This energizes the solenoid 48 and causes the relay 50 to complete a circuit from the line 47 to the line 20 through the movable contact 52 of the relay 50. Thus, a circuit, paralleling that of the switch 42 to the solenoid 45, is produced during the period that the movable contact 52 is held closed and, if desired, the switch 42 may be immediately opened and the circuit of the line 20, through the valve-controlling solenoid 45, to the line 21, will be maintained by the relay 50 until the solenoid 48 is de-energized.

When the pressure in the cylinder 8 of the welder 1 rises to a pressure above a welding pressure, the pressure switch 54 is operated to complete a circuit from the line 20, through the line 55, the solenoid 57 of the contactor switch 58, the line 60, through the movable contact 40 of the relay 38, to the line 21, and the solenoid 57 is energized and completes a circuit from the line 20, through the contactor switch 58, to the line 21. This causes flow of the current through the primary 61 of the transformer 14 and induces the flow of the welding current through the secondary 62, the electrodes 2 and 4, and the work 5, until metal of the contacting surface portions of the pressed parts of the work 5 is sufficiently fused to integrate.

The contactor switch 58 not only causes the flow of a current through the primary 61 but, also, causes the flow of current through a circuit parallel thereto from the line 20, comprising the line 63, to the secondary 64 of the transformer 65, to the line 20 and the electrodes 2 and 4 are not only connected to the secondary 62 of the transformer 14, but, also, to the primary 68 of the transformer 70 by the lines 67 and 69 to cause a flow through the primary 68 by the potential difference created at the points of contact of the electrodes on the surfaces of the work by the welding current produced by the secondary 62.

The secondaries 71 and 72, of the transformers 65 and 70, are connected together to produce counter-potentials and are wound in such phase relation to each other and with respect to the secondary 62 of the transformer 14, and are provided with relatively adjustable resistances as to produce zero potential on the grid 34 to permit the continuance of flow from the secondary 35 of the transformer 27, through the electronic tube 31, to the solenoid 37 of the relay 38, until a predetermined low resistance through the work at the points of contact of the electrodes 2 and 4 is produced by the heat of the welding current or until the potential difference between the electrodes 2 and 4 becomes correspondingly small.

In order to produce this balanced relation, as between the potentials produced by the secondaries 71 and 72 and the desired extent of integration by fusion in the production of the weld, a variable resistance element 74 is connected across the terminals of the secondary 71 to vary the potential preponderance produced by the secondary 71, relative to the voltage produced by the secondary 72, and a variable resistance element 75 is located in series with the secondary 72 and the filament 30 to vary the effective drop of potential of the coils 71 and 72 in the tube and a marked change in the potential of the secondary 72 when the potential difference between the electrodes 2 and 4 reduces a predetermined amount though the reduction may be relatively slight. Thus, the welding current, by the heat it produces, operates to terminate its flow when the desired fusion is produced. This is of particular advantage for welding work that requires, in different portions of the work, or in work of different kinds, different time periods of flow, such as is caused by different thicknesses of metal of different metal characteristics or where buckling or deformation of the metal occurs at the point of the weld, since the heating period of the welding current is automatically varied by itself according to the heating results produced, and injury to the metal, by excess heating, is avoided.

When the grid 34 is charged to a required potential, the flow of the current, from the secondary 35 of the transformer 27, through the solenoid 37 of the relay 38, will be stopped and the contacts of the relay 39 will be opened.

When the movable contact 40 of the relay 38 opens, the circuit through the pressure switch 54, from the line 20, through the line 55, the solenoid 57, the line 60, the movable contact 40, and the line 21 is broken and the connection of the primary 61 to the line 21 is opened and the welding current ceases to flow. In order to prevent operation of the valve 11 by de-energization of the solenoid 45, in advance of the cessation of flow of the welding current by the opening of the circuit through the line 47, the movable contact 52, the line 20 and the de-energization of the solenoids 48 and 37, the valve-operating solenoid 45 is connected through the line 47, the movable contact 78 of the relay 80, to the line 20. The solenoid 81 of the relay 80 is connected to the line 20 and a circuit is established through the contactor switch 58, when the switch is opened, to the line 21. Thus, when the contactor switch 58 is closed, the solenoid 81 of the relay 80 is de-energized and its movable contact 78 closes and is maintained closed until the contactor switch 58 is opened, whereby the valve-controlling solenoid 45 is maintained energized through the line 47, the movable contact 78 of the relay 80, to the line 20, until the contactor switch 58 is opened. This insures that the electrodes will be maintained in contact with the work by the pressure in the cylinder 8 until the contactor switch is fully opened to insure cessation of flow of the welding current before the electrodes are separated from the work and prevent burning of the metal by arcing.

The welder may again be shifted along the work 5 to the point where the succeeding weld is to be produced, whereupon the switch 42 may again be closed to cause the initiation of the operation, as described above, and produce the succeeding weld.

I claim:

1. In a control system for a work circuit having a source of current, the combination of an electronic valve having a pair of principal electrodes and a control electrode, said valve being alterable between conductive and non-conductive conditions means connected to said principal electrodes for controlling the flow of current in said work circuit and effective to cause flow of work current so long as said valve is in one of said conditions and to terminate such flow when said valve is altered to its other condition, first and second elements connected in series circuit relation with said control electrode for applying electromotive forces to said control electrode so that when the forces thereof reach predetermined relative values the resultant potential on said control electrode alters said valve from said one to the other of said conditions, and means for energizing said elements including means for energizing one of said elements in accordance with an electrical characteristic of said work circuit which varies during the flow of current through said work circuit.

2. In a control system for a work circuit having a source of current, the combination of an electronic valve having a pair of principal electrodes and a control electrode, means connected to said principal electrodes and effective while said valve is in a conducting condition to connect said work circuit to said source of current and produce a flow of current therethrough, first and second elements connected in series circuit relation with said control electrode for applying electromotive forces to said control electrode so that when the forces thereof attain predetermined relative values the resultant potential on said control electrode renders said valve non-conducting thereby terminating the flow of current through said work circuit, and means for energizing said elements including means for energizing one of said elements in accordance with an electrical characteristic of said work circuit which varies during the flow of current through said work circuit.

3. In a control system for a work circuit having a source of current, the combination of an electronic valve having a pair of principal electrodes and a control electrode, means connected to said principal electrodes and effective while said valve is in a conducting condition to connect said work circuit to said source of current and produce a flow of current therethrough, first and second elements opposingly connected in series circuit relation with said control electrode for applying opposing electromotive forces to said control electrode so that when the forces thereof attain predetermined relative values the resultant potential on said control electrode renders said valve non-conducting thereby terminating the flow of current through said work circuit, and means for energizing said elements including means for energizing one of said elements in accordance with an electrical characteristic of said work circuit which varies during the flow of current through said work circuit.

4. In a control system for a work circuit having a source of current, the combination of an electronic valve having a pair of principal electrodes and a control electrode, means connected to said principal electrodes and effective while said valve is in a conducting condition to connect said circuit to said source of current and produce a flow of current through said work circuit, first and second transformers each having primary and secondary windings, means oppositely connecting said secondary winding in series circuit relation with said control electrode so that when the potentials thereof attain predetermined relative values the resultant potential on said control electrode renders said valve non-conducting thereby terminating the flow of current in said work circuit, and means for energizing said primary windings including means for energizing one thereof in accordance with an electrical characteristic of said work circuit which varies during the flow of current through said work circuit.

5. In a control system for a work circuit having a source of current, the combination of an electronic valve having a pair of principal electrodes and a control electrode, means connected to said principal electrodes and effective while said valve is in a conducting condition to connect said work circuit to said source of current and produce a flow of current through said work circuit, first and second transformers each having primary and secondary windings, means oppositely connecting the secondary windings in series circuit relation with the control electrode, a control member, means responsive to the control member for applying potentials to the primary windings such as to produce a resultant potential on said control electrode which renders the valve conducting, said last-mentioned means including means for altering the potential of one of said primary windings in accordance with an electrical characteristic of the work circuit which varies during the flow of the current in said work circuit whereby after a predetermined period of flow of said current the resultant potential on said control electrode renders the valve non-conducting and terminates the flow of current through the work circuit.

CLETUS J. COLLOM.